United States Patent Office 3,132,165
Patented May 5, 1964

3,132,165
PREPARATION OF ALKENYL FERROCENES
Ivan Pascal and William J. Borecki, Wilmington, Del., assignors to E. I. du Pont de Nemours and Company, Wilmington, Del., a corporation of Delaware
No Drawing. Filed May 25, 1962, Ser. No. 197,600
9 Claims. (Cl. 260—439)

This invention relates to an improvement in the process for preparing cyclopentadienyl(alkenylcyclopentadienyl)iron compounds, broadly referred to hereinafter as "alkenyl ferrocenes," by catalytic dehydration of cyclopentadienyl(alpha-hydroxyalkylcyclopentadienyl)iron compounds.

Heretofore the alkenyl ferrocenes have been prepared by the dehydration of the corresponding alpha-hydroxyalkyl compounds using alumina as a catalyst and carrying out the reaction under reduced pressure at temperatures of from 200° to 209° C. (see U.S. Patent 2,821,512), or by dehydration in a column packed with glass beads at temperatures of 100° to 500° C. In these processes, when the reaction is carried out at low temperatures it does not reach completion, while with higher temperatures undesirable side reactions take place with accompanying polymerization of the olefinic compound produced, as well as thermal degradation of both the reactant and the resulting product. For this reason, these products have not been produced in large scale plant manufacture.

The alkenyl ferrocenes have been found to be useful starting materials for the formation of polymers, of which polymeric vinyl ferrocene is a typical example. Such compounds may also be copolymerized with other polymerizable monomers. The alkenyl ferrocenes are also of value as antistatic agents and in the preparation of other dicyclopentadienyl iron derivatives. The reactivity of these compounds also makes possible the preparation of a wide range of organic iron compounds.

It is an object of the present invention to provide a process for carrying out the dehydration of cyclopentadienyl(alpha-hydroxyalkylcyclopentadienyl)iron compounds to the corresponding cyclopentadienyl(alkylenecyclopentadienyl)iron compounds under mild conditions, and therefore without the formation of undesirable by-products, and which will give relatively high yields of the cyclopentadienyl(alkenylcyclopentadienyl)iron compounds.

According to the present invention, the cyclopentadienyl(alpha-hydroxyalkylcyclopentadienyl)iron compounds are subjected to a dehydration reaction in the presence of a hydrated or partially hydrated cupric salt of an inorganic acid, preferably the sulfate or chloride. The dehydration is carried out by heating the alpha-hydroxyalkyl compound in an inert organic solvent at temperatures of from 35° to 150° C. and preferably at temperatures of from 70° to 100° C. The inert solvent is preferably one which forms an azeotrope with water so that the water evolved in the reaction may immediately be removed by azeotropic distillation. Benzene, acetone, toluene, or even low-boiling solvents such as diethyl ether, may be employed. When carrying out the reaction in solvents which do not form azeotropic mixtures with water, the reaction is preferably carried out at temperatures above 100° C. so that the water formed in the reaction can be distilled off. The use of higher temperatures such as from 140° to 150° C. is convenient when the process is carried out as a continuous process and short reaction times are preferred.

The cyclopentadienyl(alpha-hydroxyalkylcyclopentadienyl)iron compounds which may be prepared as described in U.S. Patent 2,810,737 or in Canadian Patent 613,806 are preferably dissolved in the inert solvents, and the cupric salt carrying at least one mol of water of hydration is added in finely divided form in order to present a large catalytic surface. In some cases it is desirable to add a polymerization inhibitor such as is commonly used in reactions involving polymerizable compounds. Compounds such as hydroquinone, substituted hydroquinones, tertiarybutyl catechol and phenothiazine, illustrate this type of polymerization inhibitor. The use of such polymerization inhibitors ensures against possible polymerization of the alkenyl ferrocene in the reaction mass. It is to be understood, however, that the dehydration reaction may be carried out in the absence of such polymerization inhibitors, particularly where mild conditions are employed. Where the lower-boiling solvents are employed, the reaction is carried out at reflux temperatures for from one to ten hours, and preferably in the absence of air (that is, under an atmosphere of nitrogen and preferably in the absence of light). The water which is formed may be continuously removed from the reaction by distillation.

The cyclopentadienyl(alpha-hydroxyalkylcyclopentadienyl)iron compounds which have been found to be satisfactorily dehydrated by the process of the present invention are those which have the general formula:

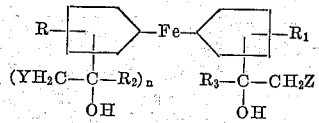

wherein R and $R_1$ are the same or different members of the group consisting of hydrogen, alkyl, cycloalkyl, and aryl radicals of the benzene series, $R_2$ and $R_3$ are the same or different members of the group consisting of hydrogen and alkyl groups of up to four carbon atoms; Y and Z are the same or different members of the group consisting of hydrogen, alkyl groups containing up to four carbon atoms, and phenyl; and $n$ is 0 or 1. The alkyl groups included in the designations R and $R_1$ may be any alkyl group containing from 1 to 16 carbon atoms, either straight or branched chain, such as methyl, ethyl, isopropyl, butyl, hexyl, octyl, decyl, dodecyl and hexadecyl. The cycloaliphatic groups that may come within the designation R and $R_1$ include the cyclopentadienyl radical, while the aryl groups of the benzene series may be illustrated by phenyl, benzyl, tolyl and biphenyl.

Among the alkenyl ferrocene compounds which are prepared by this process are vinyl ferrocene;
propenyl ferrocene;
isobutenyl ferrocene;
styryl ferrocene;
1-methylcyclopentadienyl-1'-(vinylcyclopentadienyl)iron;
1-hexylcyclopentadienyl-1'-(isopropenylcyclopentadienyl)iron;
1,1'-divinyl ferrocene;
1,2-diisobutenyl ferrocene;
1-phenylcyclopentadienyl-1'-(vinylcyclopentadienyl)iron;
1-biphenylcyclopentadienyl-1'-(propenylcyclopentadienyl)iron;
1-cyclopentadienylcyclopentadienyl-1'-(butenylcyclopentadienyl)iron;
1,3-bis(vinyldecylcyclopentadienyl)iron; and
1-butylcyclopentadienyl-2'-(propenylethylcyclopentadienyl)iron.

The dehydration process is catalyzed by the presence of cupric ion, $Cu^{++}$. It is used in the process in the form of a salt, such as the chloride or sulfate, preferably cupric sulfate. In a completely anhydrous system with an anhydrous catalyst, the reaction rate is too slow to be practical. The presence of a trace of moisture accelerates the reaction and it is desirable to have water present in the system in the form of a hydrate of the catalytic salt.

It is preferable for all practical purposes to use a readily available hydrate salt containing at least an average of 1 mol of water and preferably one of the higher hydrates such as $CuSO_4 \cdot 5H_2O$.

The amount of catalyst necessary for effective reaction is not critical. Generally a small amount ranging from 0.001 to 0.1 part of catalyst per part of starting material is sufficient in a batch process. For maximum efficient use of catalyst, it is advantageous to mill, grind, pulverize or otherwise prepare the catalyst in finely divided form for greater contact between catalyst and reactant.

By the use of the cupric salts above-mentioned, it is now possible to obtain near-quantitative yields of alkenyl ferrocene compounds without undesirable side reactions. The process may be conducted as a batch process, or it may be run as a continuous process, whereby the solution of reactant is passed over a catalyst bed and water is continuously removed by distillation. If essentially complete conversion of the starting material is not achieved during the first pass, the solution can be recycled over the catalyst bed.

The following examples are given to more fully illustrate the process of this invention. The parts used are by weight, unless otherwise specified.

Example 1

230 parts of cyclopentadienyl(alpha-hydroxyethylcyclopentadienyl)iron, 693 parts of toluene, 1 part of diamyl hydroquinone and 2 parts of $CuSO_4 \cdot 5H_2O$ (micropulverized to pass through a 0.020 inch screen) were heated under reflux in a glass-lined stainless steel reaction vessel equipped with a reflux condenser, water separator, nitrogen inlet tube and magnetic stirrer. Heating and stirring under nitrogen atmosphere were continued until approximately 18 parts of water were collected in the water separator. The reaction mixture was cooled, filtered to remove the copper sulfate and evaporated to dryness at from 40° to 45° C. under 2 mm. Hg pressure. The residue was dissolved in 790 parts of methanol, filtered to separate a small amount of tarry by-product, and the resulting solution was cooled, first to 0° C., then to —60° C. in Dry Ice. The crystalline product, vinyl ferrocene (207 parts, 97.6% yield), was isolated by filtration and dried in vacuo at room temperature. Product melted at 47° to 49° C.

Analysis.—Calcd. for $C_{12}H_{12}Fe$: C, 67.96; H, 5.70; Fe, 26.23. Found: C, 68.0, 68.0; H, 5.9, 6.1; Fe, 26.6, 26.3.

When $CuCl_2 \cdot 2H_2O$ is substituted in the above example, substantially the same results are obtained.

By substituting 1-methylcyclopentadienyl-1'-(alpha-hydroxypropylcyclopentadienyl)iron for the starting material in the above example, the corresponding 1-methylcyclopentadienyl-1'-(propenylcyclopentadienyl)iron is obtained. Similarly, 1,1'-divinyl ferrocene is obtained from bis(alpha-hydroxyethylcyclopentadienyl)iron; 1-phenylcyclopentadienyl-1' - (isobutenylcyclopentadienyl)iron from the corresponding alpha-hydroxyisobutyl derivative; 1-cyclopentadienylcyclopentadienyl-1'-(vinylcyclopentadienyl)iron from the corresponding alpha-hydroxyethyl derivative and bis(1-propenyl-1'-octylcyclopentadienyl)iron from bis [1-(alpha-hydroxypropyl)-1'-octylcyclopentadienyl] iron.

Example 2

When the details of Example 1 were followed, using 10 parts of cyclopentadienyl(alpha-hydroxyethylcyclopentadienyl)iron, 35 parts of benzene, 0.05 part of $CuSO_4 \cdot 3H_2O$, without the addition of a polymerization inhibitor, and refluxing for 8 hours, 6.6 parts of vinyl ferrocene were obtained.

Example 3

The details of Example 1 were followed, using 53 parts of cyclopentadienyl(alpha-hydroxyethylcyclopentadienyl)iron, 260 parts of toluene, 0.5 part of $$CuSO_4 \cdot 3H_2O$$

and 0.04 part of tertiarybutyl catechol as a polymerization inhibitor and refluxing for 4.5 hours. The toluene was removed in vacuo, the residue redissolved in petroleum ether, filtered and cooled in Dry Ice. The vinyl ferrocene product (44.6 parts) was recrystallized from methanol.

By the use of this invention, an economically feasible process is provided for the production of alkenyl ferrocene compounds, essentially without the formation of undesirable side products. Near quantitative yields are obtained.

What is claimed is:

1. In the process for preparing cyclopentadienyl(alkenyl cyclopentadienyl)iron compounds by dehydration of cyclopentadienyl(alpha - hydroxyalkylcyclopentadienyl) iron compounds, the improvement which comprises carrying out the dehydration at a temperature in the range of from 35° to 150° C., in an inert organic solvent in the presence of a hydrate cupric salt of an inorganic acid of the class consisting of hydrochloric acid and sulfuric acid.

2. The process of claim 1 in which the organic solvent forms an azeotrope with water.

3. The process of claim 2 in which the cupric salt is $CuSO_4 \cdot 5H_2O$.

4. The process of claim 3 in which the cyclopentadienyl(alpha - hydroxyalkylcyclopentadienyl)iron compound is cyclopentadienyl(alpha-hydroxyethylcyclopentadienyl)iron.

5. The process of claim 1 in which the reaction is carried out in the presence of a polymerization inhibitor.

6. The process of claim 4 in which the reaction is carried out in the presence of diamyl hydroquinone.

7. In the process for preparing cyclopentadienyl(vinylcyclopentadienyl)iron by dehydration of cyclopentadienyl-(alpha-hydroxyethylcyclopentadienyl)iron, the improvement which comprises carrying out the dehydration, at a temperature in the range of from 35° to 150° C., in an inert organic solvent in the presence of a hydrate cupric salt of an inorganic acid of the class consisting of hydrochloric acid and sulfuric acid.

8. In the process for preparing cyclopentadienyl(vinylcyclopentadienyl)iron by dehydration of cyclopentadienyl-(alpha-hydroxyethylcyclopentadienyl)iron, the improvement which comprises carrying out the dehydration, at a temperature in the range of from 35° to 150° C., in an inert organic solvent in the presence of a hydrate cupric salt of sulfuric acid.

9. In the process for preparing cyclopentadienyl(vinylcyclopentadienyl)iron by dehydration of cyclopentadienyl-(alpha-hydroxyethylcyclopentadienyl)iron, the improvement which comprises carrying out the dehydration, at a temperature in the range of from 35° to 150° C., in an inert organic solvent in the presence of a hydrate cupric salt of hydrochloric acid.

References Cited in the file of this patent
UNITED STATES PATENTS 2,821,512     Haven     Jan. 28, 1958

OTHER REFERENCES

Chemical Abstracts, volume 41 (1947), page 3756g.